US012650324B2

(12) United States Patent
Xu et al.

(10) Patent No.: US 12,650,324 B2
(45) Date of Patent: Jun. 9, 2026

(54) FLOW MEASUREMENT METHOD BASED ON DYNAMIC OPTIMIZATION OF THREE PRESSURE SENSORS

(71) Applicants: Beihang University, Beijing (CN); Ningbo Institute of Technology, Beihang University, Ningbo City (CN)

(72) Inventors: Yuanzhi Xu, Beijing (CN); Zongxia Jiao, Beijing (CN); Qizhi Yang, Beijing (CN); Xiaoxi Zhao, Beijing (CN)

(73) Assignees: Beihang University, Beijing (CN); Ningbo Institute of Technology, Beihang University, Ningbo City (CN)

( * ) Notice: Subject to any disclaimer, the term of this patent is extended or adjusted under 35 U.S.C. 154(b) by 214 days.

(21) Appl. No.: 18/401,647

(22) Filed: Jan. 1, 2024

(65) Prior Publication Data

US 2024/0183696 A1 Jun. 6, 2024

Related U.S. Application Data

(63) Continuation-in-part of application No. 17/718,383, filed on Apr. 12, 2022, now abandoned.

(30) Foreign Application Priority Data

Jun. 25, 2021 (CN) .......................... 202110714189.0

(51) Int. Cl.
*G01F 1/34* (2006.01)
(52) U.S. Cl.
CPC ...................................... *G01F 1/34* (2013.01)
(58) Field of Classification Search
CPC ...................................... G01F 1/34; G01F 1/50
(Continued)

(56) References Cited

U.S. PATENT DOCUMENTS 5,708,211 A * 1/1998 Jepson .................... G01F 1/708
73/861.04
6,889,562 B2 * 5/2005 Gysling .................. G01F 1/712
73/861.42
(Continued)

FOREIGN PATENT DOCUMENTS

CN 1869602 A 11/2006
CN 101995275 A 3/2011
(Continued)

OTHER PUBLICATIONS

Zielke, "Frequency Dependent Friction in Transient Pipe Flow" PhD Dissertation, University of Michigan (Year: 1966).*
(Continued)

*Primary Examiner* — John Fitzgerald
(74) *Attorney, Agent, or Firm* — IPro, PLLC; Na Xu

(57) ABSTRACT

A method for measuring flow rate based on dynamic optimization of three pressure sensors is provided. In the method, pressure sensors are set on the fix positions of both ends of the test straight pipe and on the middle position of the test straight pipe, and are configured to measure the pressure of the fluid at the positions where the pressure sensors are set in real time, and the real-time dynamic flow rate of the fluid in the pipe can be estimated through a flow rate calculation estimator. The method has fast response speed and high measurement accuracy, can effectively eliminate the noise interference of vibration in the environment, and has strong anti-interference ability.

4 Claims, 3 Drawing Sheets

(58) Field of Classification Search
USPC ...................................................... 73/961.42
See application file for complete search history.

(56) References Cited

U.S. PATENT DOCUMENTS

| | | | |
|---|---|---|---|
| 7,881,884 B2 | 2/2011 | Perry et al. | |
| 8,280,650 B2 | 10/2012 | Perry et al. | |
| 9,587,552 B1 | 3/2017 | Blom et al. | |
| 12,270,691 B2 * | 4/2025 | Plecis ....................... | G01F 1/88 |
| 2002/0129662 A1 * | 9/2002 | Gysling .................. | G01F 1/712 |
| | | | 73/861.42 |
| 2011/0213572 A1 | 9/2011 | Perry et al. | |
| 2014/0200836 A1 | 7/2014 | Lee | |
| 2014/0216168 A1 * | 8/2014 | Gordin ..................... | G01F 1/72 |
| | | | 73/861.42 |
| 2018/0128660 A1 | 5/2018 | Lee | |
| 2018/0275697 A1 | 9/2018 | Lichtenegger et al. | |
| 2021/0231474 A1 * | 7/2021 | Yuuki .................... | G01F 15/00 |
| 2024/0353245 A1 * | 10/2024 | Ramakrishnan .......... | G01F 1/34 |
| 2024/0353248 A1 * | 10/2024 | Ramakrishnan ........ | G01F 1/712 |

FOREIGN PATENT DOCUMENTS

| | | |
|---|---|---|
| CN | 104903686 A | 9/2015 |
| CN | 108225448 A | 6/2018 |
| CN | 109489742 A | 3/2019 |
| CN | 110823297 A | 2/2020 |
| CN | 113447087 A | 9/2021 |

OTHER PUBLICATIONS

Johnston, "Efficient Methods for Numerical Modelling of Laminar Friction in Fluid Lines" 2004 ASME International Mechanical Engineering Congress and Exposition (Year: 2004).*
The First Office Action, CN2021107141890 Jan. 28, 2022.
Notification of Processing Registration for Formalities, CN2021107141890 Jul. 4, 2022.
Ozawa et al Estimation of Fluid Transients in a Pipe using kaiman Filter based on Optimized Finite Element Model SICE Annual Conference, The Grand Hotel, Taipei, Taiwan (Year: Aug. 18, 2010).

* cited by examiner

FLOW MEASUREMENT METHOD BASED ON DYNAMIC OPTIMIZATION OF THREE PRESSURE SENSORS

CROSS REFERENCE TO RELATED APPLICATIONS

The present application is a continuation-in-part application of U.S. patent application Ser. No. 17/718,383 filed on Apr. 12, 2022, which claims the benefit of Chinese Patent Application No. 2021107141890 filed on Jun. 25, 2021, the disclosure of which is hereby incorporated herein by reference.

FIELD OF THE INVENTION

The present disclosure relates to the technical field of measuring flow rate, in particular to a device and method for measuring flow rate based on dynamic optimization of three pressure sensors.

BACKGROUND OF THE INVENTION

The existing methods for measuring flow rate, such as differential pressure method, turbine method, vortex method, ultrasonic method and laser method, etc., have some defects. The methods for measuring flow rate, such as differential pressure method, turbine method and vortex method, etc., need an orifice, turbine or vortex generator set in the pipe. However, the orifice, turbine or vortex generator will bring throttling loss to the fluid in the pipe and influence the pattern of the fluid. At the same time, the accuracy of the method for measuring flow rate by turbine or vortex generator is limited by the accuracy of the number of turbine teeth, so it cannot measure the dynamic flow rate of the fluid accurately. Ultrasonic method and laser method are affected by the vibration in the environment, and there is a large error in the vibration environment.

SUMMARY OF THE INVENTION

In order to solve at least one technical problem in the above prior art, the embodiments of the present disclosure provides a device and method for measuring flow rate based on dynamic optimization of three pressure sensors. In the device and method, it can be optimized dynamically based on pressure sensor, the device has a simple and compact structure, and the device and method have high dynamic effect and strong anti-interference ability.

One aspect, the embodiment of the present disclosure provides a device for measuring flow rate based on dynamic optimization of three pressure sensors. The device comprises a test straight pipe, a flow rate calculation estimator and three pressure sensors;

the test straight pipe has an equal cross-section passage and is configured to provide a passage through which a measured fluid flows; a first pressure sensor and a second pressure sensor are respectively set on a boundary of both ends of the test straight pipe, and are configured to measure boundary pressures of two ends of the fluid in the test straight pipe; and a third pressure sensor is set on the test straight pipe between the first pressure sensor and the second pressure sensor to measure monitoring pressure of the fluid in the middle of the test straight pipe; and the flow rate calculation estimator is respectively connected to the three pressure sensors, and is configured to acquire a flow rate of the fluid in the test straight pipe according to the boundary pressures and the monitoring pressure.

Another aspect, the embodiment of the present disclosure provides a method for measuring flow rate based on dynamic optimization of three pressure sensors, and the method is applied to the above device for measuring flow rate based on dynamic optimization of three pressure sensors. The method comprises:

acquiring boundary pressures of a fluid in both ends of a test straight pipe and a monitoring pressure of the fluid in the middle of the test straight pipe;

acquiring a predicted pressure of the fluid in the middle of the test straight pipe according to the boundary pressures;

optimizing a pipe hydrodynamics module according to the predicted pressure and the monitoring pressure to enable the predicted pressure constantly close to the monitoring pressure; and acquiring a flow rate of the fluid in the test straight pipe according to the boundary pressures and the optimized pipe hydrodynamics module.

The device for measuring flow rate based on dynamic optimization of three pressure sensors in the embodiment of the present disclosure comprises a test straight pipe, a flow rate calculation estimator and three pressure sensors, has a simple and compact structure and is convenient to assemble. In the method for measuring flow rate based on dynamic optimization of three pressure sensors, pressure sensors are set on the fix positions of both ends of the test straight pipe and on the middle position of the test straight pipe, and are configured to measure the pressure of the fluid at the positions where the pressure sensors are set in real time, and the real-time dynamic flow rate of the fluid in the pipe can be estimated through a flow rate calculation estimator. This method has fast response speed and high measurement accuracy, can effectively eliminate the noise interference of vibration in the environment, and has strong anti-interference ability.

BRIEF DESCRIPTION OF THE DRAWINGS

The accompanying drawings illustrate exemplary embodiments of the present disclosure and, together with its description, are used to explain the principles of the present disclosure, which are included to provide a further understanding of the present disclosure, and are included in and form a part of the specification.

Figure 1:
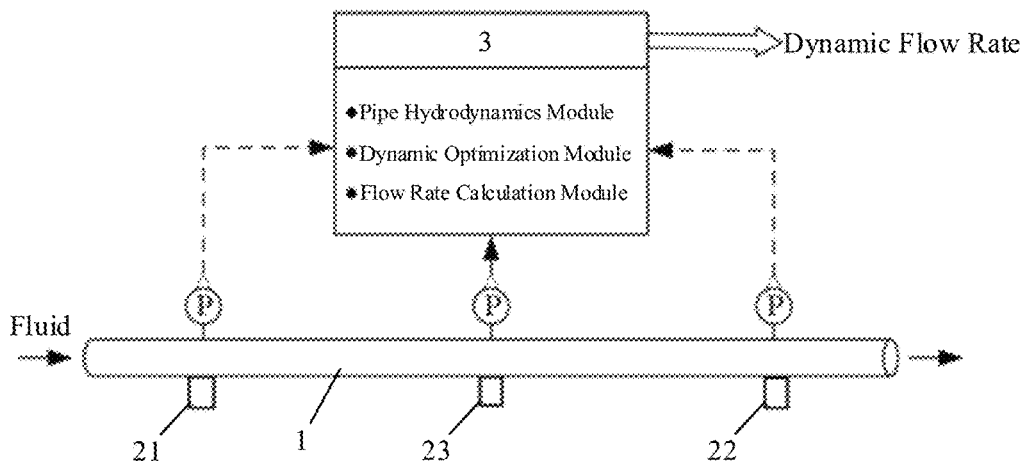
FIG. 1 is an exemplary structural diagram of a device for measuring flow rate based on dynamic optimization of three pressure sensors in the embodiment of the present disclosure.

In the figures: 1—test straight pipe, 21—the first pressure sensor, 22—the second pressure sensor, 23—the third pressure sensor, 3—flow rate calculation estimator.

DETAILED DESCRIPTION OF THE INVENTION

The present disclosure will be further described in detail below in conjunction with the drawings and embodiments. It can be understood that the specific embodiments described here are only used to explain related content, but not to limit the present disclosure. In addition, it should be noted that, for ease of description, only the parts related to the present disclosure are shown in the drawings.

It should be noted that the embodiments in the present disclosure and the features in the embodiments can be combined with each other if there is no conflict. Hereinafter, the present disclosure will be described in detail with reference to the drawings and in conjunction with the embodiments.

It should be noted that the step number in the present disclosure is only for the convenience of the explanation of the specific embodiment, and is not used to limit the sequence of step execution.

The method provided by the embodiment of the present disclosure can be executed by the relevant processor, and the following will take the processor as the execution subject as an example. It can be understood that the execution subject can be adjusted according to the actual demand. For example, the execution subject can also be servers, electronic devices, computers, etc.

One aspect of the embodiment of the present disclosure provides a device for measuring flow rate based on dynamic optimization of three pressure sensors. As shown in FIG. 1, a device for measuring flow rate based on dynamic optimization of three pressure sensors comprises a test straight pipe 1, pressure sensors and a flow rate calculation estimator 3.

The test straight pipe 1 has an equal cross-section passage and is configured to provide a passage through which the measured fluid flows. That is, the test straight pipe 1 is a straight pipe with fixed length and equal cross-section, which provides a passage through which the measured fluid flows and fixed points for setting the pressure sensors. In the test straight pipe, the fluid flows in from one end and flows out from the other end, and the cross-sectional area through which the fluid flows in the pipe does not change. The flow rate of fluid in the pipe is the object to be measured.

There are three pressure sensors. Wherein, two pressure sensors are respectively set on the boundary or edge of both ends of the test straight pipe 1, which can be called boundary pressure sensor. The other pressure sensor is set on a certain position on the test straight pipe between the two boundary pressure sensors, which can be called monitoring pressure sensor. The boundary pressure sensors are set on the boundary of the test straight pipe with a fixed distance and the monitoring pressure sensor is located between the boundary pressure sensors. The pressure sensors are configured to measure the fluid pressure at the position where the pressure sensor is set in real time. The fixed distance of the adjacent pressure sensors on the test straight pipe 1, that is, the relative distance between the two adjacent sensors, can be flexibly adjusted by the operator according to the actual measurement needs. Specifically, the first pressure sensor 21 and the second pressure sensor 22 are respectively set on the boundary of the two ends of the test straight pipe 1 to measure the boundary pressures of the two ends of the fluid in the test straight pipe 1, and the third pressure sensor 23 is set on the test straight pipe 1 between the first pressure sensor 21 and the second pressure sensor 22 to measure the monitoring pressure of the fluid in the middle of the test straight pipe 1.

The flow rate calculation estimator 3 is respectively connected to the three pressure sensors to receive the measured values of the three pressure sensors, and is configured to calculate or acquire the flow rate of the fluid in the test straight pipe 1 according to the boundary pressures and the monitoring pressure. The flow rate solution estimator 3 collects or acquires the fluid pressure values measured by the boundary pressure sensors as the boundary input, and collects or acquire the fluid pressure value measured by the monitoring pressure sensor as the correction basis. The flow rate solution estimator 3 is used for real-time dynamic optimization to estimate the accurate flow rate of the fluid in the pipe. The flow rate calculation estimator 3 can be formed by integrated circuit modules, which are integrated with modules to realize different functions.

Figure 2:
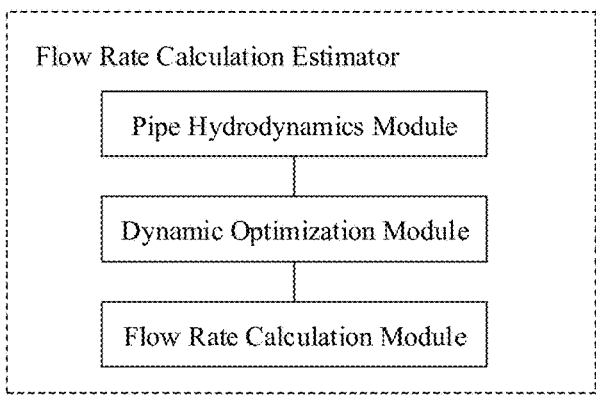
FIG. 2 is an exemplary structure diagram of the flow rate calculation estimator in the embodiment of the present disclosure.

Optionally, as shown in FIG. 2, the flow rate calculation estimator 3 comprises a pipe hydrodynamics module, a dynamic optimization module and a flow rate calculation module, and a pipe hydrodynamics model is integrated in the pipe hydrodynamics module.

The pipe hydrodynamics module calculates or acquires the predicted pressure of the fluid in the middle of the test straight pipe 1 based on the boundary pressures.

The dynamic optimization module optimizes the pipe hydrodynamics module based on the predicted pressure and monitoring pressure. That is, the pipe hydrodynamic model integrated in the pipe hydrodynamics module is optimized, so that the predicted pressure is constantly close to the monitoring pressure, that is, the difference between the predicted pressure and monitoring pressure is reduced and finally falls into a reference range. Wherein, the reference range can be adjusted or set according to the actual accuracy requirements. That is, the measured monitoring pressure information is used as the correction basis, and the pipe hydrodynamics module can be optimized by the dynamic optimization algorithm according to the correction basis, so that the estimated value of the monitoring pressure approximates the real value.

The flow rate calculation module calculate or acquire the flow rate of the fluid in the test straight pipe 1 based on the boundary pressures and the optimized pipe hydrodynamics module.

Figure 3:
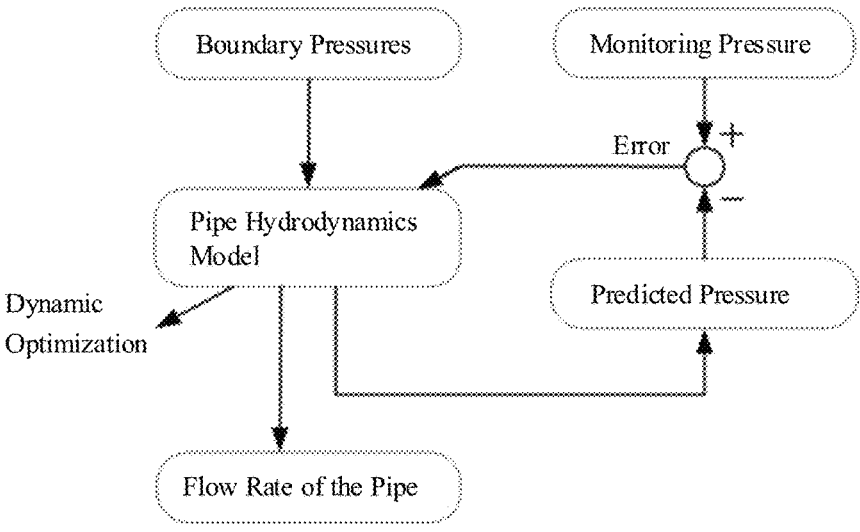
FIG. 3 is an exemplary process diagram of a method for measuring flow rate based on dynamic optimization of three pressure sensors in the embodiment of the present disclosure.

As shown in FIG. 3, another aspect of the embodiment of the present disclosure provides a method for measuring flow rate based on dynamic optimization of three pressure sensors. The method is applied to the device for measuring flow rate based on dynamic optimization of three pressure sensors disclosed above, and the method comprises the following steps.

The boundary pressures of the fluid in the both ends of the test straight pipe 1 and the monitoring pressure of the fluid in the middle of the test straight pipe 1 are acquired. Wherein, the boundary pressures of the fluid in the both ends of the test straight pipe 1 are measured or acquired by the first pressure sensor 21 and the second pressure sensor 22. The monitoring pressure of the fluid in the middle of the test straight pipe 1 is measured or acquired by the third pressure sensor 23.

The predicted pressure of the fluid in the middle of the test straight pipe 1 is acquired based on the boundary pressures. This step can be executed by the flow rate calculation estimator 3. In this step, the two boundary pressure values are inputted into the pipe hydrodynamics module to calculate the predicted pressure of the fluid in the middle of the test straight pipe 1. The predicted pressure is the pressure of the fluid at the position where the monitoring pressure sensor locates.

The pipe hydrodynamics module is optimized based on the predicted pressure and monitoring pressure to enable the predicted pressure constantly close to the monitoring pressure. This step can be executed by the flow rate calculation estimator 3. The pipe hydrodynamics module is optimized by the dynamic optimization module based on the predicted pressure and monitoring pressure to enable the predicted pressure constantly close to the monitoring pressure. That is, the measured monitoring pressure information is used as the correction basis, and the pipe hydrodynamics module is optimized dynamically by the dynamic optimization algorithm based on the correction basis to enable the estimated value of the monitoring pressure is close to the real value.

Based on the boundary pressures and the optimized pipe hydrodynamics module, the flow rate of the fluid in the test straight pipe 1 can be acquired. Through the optimization of the above step, the pipe hydrodynamics module is more accurate, so that the flow rate of the fluid in the test straight pipe 1 can be acquired accurately according to the real-time boundary pressures. In addition, optionally, the acquired flow rate data can be output to the human-computer interaction device for viewing and analysis.

It should be noted that, for the pipe hydrodynamics module and the flow rate calculation algorithm in the flow rate calculation estimator 3, it is need to set calculation time interval and spatial grid division.

1) Determining the set positions of the two boundary pressure sensors and the monitoring pressure sensor, measuring the distances between adjacent pressure sensors, and save the set positions and the distances to the flow rate calculation estimator 3.

2) Setting the parameters of the test straight pipe 1 and the fluid, dividing the spatial grid and setting the algorithm operation time step in the flow rate calculation estimator 3.

3) Setting the parameters of the dynamic optimization algorithm.

At the beginning of measurement, the value of fluid pressure and flow rate need to be initialized. However, the optimal estimation algorithm adopted by the flow rate calculation estimator 3 does not depend on the initial value of the flow rate, and the final solution is not affected by the initial value of the flow rate, so that any initial value of flow rate can be accepted. Therefore, the assistance of additional flowmeter does not required.

Optionally, that the predicted pressure of the fluid in the middle of the test straight pipe 1 is acquired based on the boundary pressures comprises:

the boundary pressures are input into the pipe hydrodynamics module, and the predicted pressure is acquired by solving the pipe hydrodynamics equation according to the method of characteristics. Specifically, the boundary pressures are input into the pipe hydrodynamics module, which comprises the processing and solving of the hydrodynamics equation. For example, firstly, the equation is processed according to the method of characteristics to enable the equation transform to a solvable ordinary differential equation; secondly, the ordinary differential equation is solved to acquire the relationship equation between the predicted pressure and the boundary pressures; finally, the boundary pressures as the boundary condition are input into the pipe hydrodynamics module to calculate the predicted pressure.

The dynamical partial differential equation of fluid in a pipe includes fluid momentum equation and fluid continuity equation, that is, equation (1) and equation (2):

$$\frac{\partial q}{\partial t} + \frac{A}{\rho}\frac{\partial p}{\partial x} + f(q) = 0, \tag{1}$$

$$\frac{\partial p}{\partial t} + \frac{\rho c^2}{A}\frac{\partial q}{\partial x} = 0, \tag{2}$$

where p and q are respectively a pressure and a flow rate of the fluid in the pipe, $\rho$ is a density of the fluid, A is a cross-sectional area of a flow in the pipe, c is a wave velocity the fluid, f(q) is a friction term of the fluid, which is related to the flow rate of the fluid; x is a coordinate along an axial direction of the pipe, and t is a time.

The hydrodynamic equation is a complex hyperbolic partial differential equation, which cannot be directly calculated. The method of characteristics is an effective solution for solving the hyperbolic partial differential equation. The process of solving the hyperbolic partial differential equation by using the method of characteristics is as follows.

Equation (3) and equation (4) can be obtained based on equation (1) and equation (2):

$$\frac{\partial q}{\partial t} = -\frac{A}{\rho}\frac{\partial p}{\partial x} - f(q), \tag{3}$$

$$\frac{\partial q}{\partial x} = -\frac{A}{\rho c^2}\frac{\partial p}{\partial t}. \tag{4}$$

When there is equation (5):

$$\frac{dq}{dt} = \frac{\partial q}{\partial t} + \frac{\partial q}{\partial x}\frac{dx}{dt}, \tag{5}$$

equation (6) can be obtained by substituting equation (3) and equation (4) into equation (5):

$$\frac{dq}{dt} = -\frac{A}{\rho c^2}\frac{dx}{dt}\left(\frac{\partial p}{\partial t} + c^2\frac{dt}{dx}\frac{\partial p}{\partial x}\right) - f(q). \tag{6}$$

Items in a bracket on the right side of equation (6) are compared with items on the right side of equation (5), if there is $$c^2\frac{dt}{dx} = \frac{dx}{dt}, \tag{7}$$

it means that when $$\frac{dx}{dt} = \pm c, \tag{8}$$

the right side of equation (6) can be converted into fully differential form, namely, $$\frac{dq}{dt} = -\frac{A}{\rho c^2}\frac{dx}{dt}\left(\frac{\partial p}{\partial t} + \frac{\partial p}{\partial x}\frac{dx}{dt}\right) - f(q) = -\frac{A}{\rho c^2}\frac{dx}{dt}\frac{dp}{dt} - f(q). \quad (9)$$

Equation (8) is a condition under which equation (9) is valid, equation (8) is in a form of a straight line, and thus it is called a characteristic line. The above equation (9) is arranged to obtain the following equations, that is, on the characteristic line, there are $$\frac{dq}{dt} + \frac{A}{\rho c}\frac{dp}{dt} + f(q) = 0, \quad \frac{dx}{dt} = c, \quad (10)$$

$$\frac{dq}{dt} - \frac{A}{\rho c}\frac{dp}{dt} + f(q) = 0, \quad \frac{dx}{dt} = -c. \quad (11)$$

Figure 4:
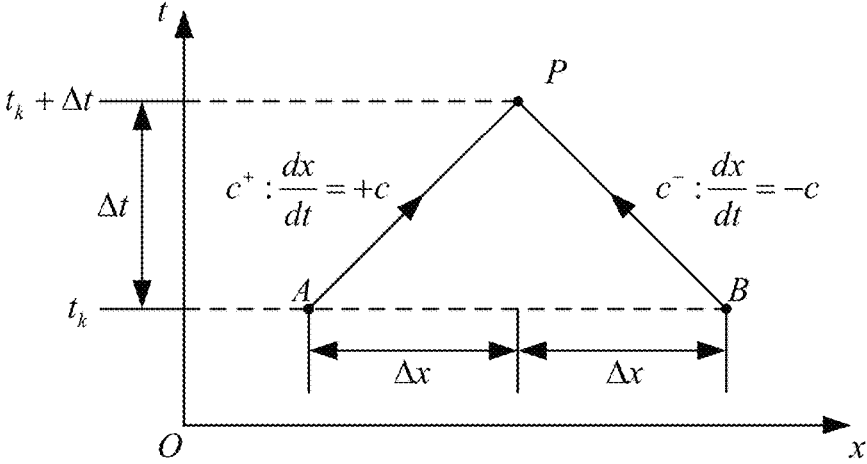
FIG. 4 is a schematic diagram of physical meaning of characteristic lines.

The significance of the solution is that on the characteristic line (namely, $$\frac{dx}{dt} = \pm c),$$

the partial differential equation can be transformed into the ordinary differential equation, so that the hydrodynamic equation can be conveniently solved on the characteristic line. And its actual physical meaning can be expressed as that a pressure wave in the fluid propagates a distance of $c\Delta t$ to left and right sides within a time interval $\Delta t$. The pipe is divided into spatial grids. As shown in FIG. 4, the state of a space point P at a time $(t_k + \Delta t)$ is calculated from the state of space points A and B at a time $t_k$ through two intersecting characteristic lines $c^+$ and $c^-$. That is, the state variables at all spatial points in the pipe can be obtained by the method of characteristics.

After the derivation of equation (3) to equation (11), the dynamic partial differential equation of the fluid in the pipe is solved by the method of characteristics and the computable ordinary differential equation is obtained. The physical meaning of the solution is shown in FIG. 4, that is, a flow rate $q_P$ and a pressure $p_P$ at a certain point P on the measured pipe at the current moment can be calculated based on a flow rate $q_A$ and a pressure $p_A$ at a point A and a flow rate $q_B$ and a pressure $p_B$ at a point B of the measured pipe at the previous moment through the characteristic lines. In order to obtain the calculation equation of the flow rate of the pipe, equation (10) and equation (11) can be written in the form of difference:

$$c^+: q_P - q_A + \frac{A}{\rho c}(p_P - p_A) + \Delta t f(q_A) = 0, \quad (12)$$

$$c^-: q_P - q_B - \frac{A}{\rho c}(p_P - p_B) + \Delta t f(q_B) = 0. \quad (13)$$

By arranging the above equation (12) and equation (13), equations for calculating the flow rate and the pressure at the point P at any position in the measured pipe (non-boundary) can be obtained as follows:

$$q_P = \frac{1}{2}\left[q_A + q_B + \frac{A}{\rho c}(p_A - p_B) - \Delta t(f(q_A) + f(q_B))\right], \quad (14)$$

-continued $$p_P = \frac{1}{2}\left[p_A + p_B + \frac{\rho c}{A}(q_A - q_B) - \Delta t\frac{\rho c}{A}(f(q_B) - f(q_A))\right]. \quad (15)$$

Figure 5:
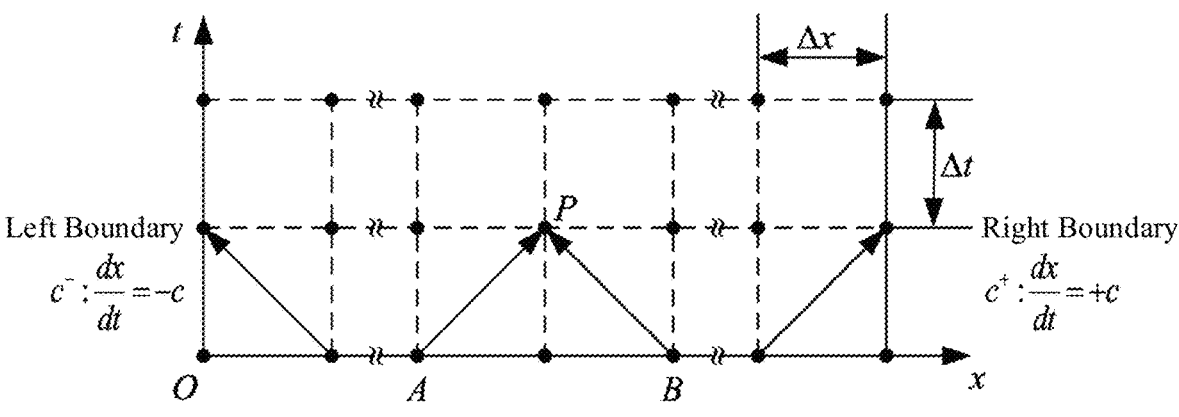
FIG. 5 is a schematic diagram for calculating characteristic lines of the interior and boundary points of the pipe.

When the point P is located at the boundary of the measured pipe, the situation is respectively special. As shown in FIG. 5, there is only one characteristic line at the left and right boundaries. Therefore, the state of the point P on the boundary needs to be calculated by a characteristic line and external input boundary conditions, and the boundary conditions are pressure values of the left and right boundaries of the measured pipe, which are calculated by the pressure sensor.

When the point P is located at the left boundary, the value $p_P$ collected by the pressure sensor is taken as the left boundary condition, and by combining with the $c^-$ characteristic line, the flow rate at the point P can be obtained as follows:

$$q_P = q_B + \frac{A}{\rho c}(p_P - p_B) - \Delta t f(q_B). \quad (16)$$

Similarly, when the point P is located at the right boundary, the pressure $p_P$ obtained by the pressure sensor is taken as the right boundary condition, at this time, the flow rate at the point P can be obtained as follows:

$$q_P = q_A - \frac{A}{\rho c}(p_P - p_A) - \Delta t f(q_A). \quad (17)$$

Considering the fluid friction term $f(q)$ in equation (1), equations of the approximate calculation model of fluid friction in a laminar flow state are the following equations (18) and (19). The first term on the left side of equations (18) and (19) is fluid steady friction, and the second term is fluid dynamic friction.

$$f(t + \Delta t) = \frac{8v}{r^2}q(t + \Delta t) + \frac{4v}{r^2}\sum_{j=1}^{4}y_j(t + \Delta t), \quad (18)$$

$$y_j(t + \Delta t) = y_j(t)e^{-\frac{n_j v \Delta t}{r^2}} + m_j[q(t + \Delta t) - q(t)]e^{-\frac{n_j v \Delta t}{2r^2}}, \quad (19)$$

where $v$ is a kinematic viscosity of the fluid, $r$ is a flow radius of the straight pipe, $m_j$ and $n_j$ are weight factors of the $j^{th}$ term, and there are following equations:

$$m_j = \mu m_{j-1}, \, j \geq 3, \quad (20)$$

$$n_j = \mu^2 n_{j-1}, \, j \geq 2, \quad (21)$$

where the values of $\mu$, $m_j$ and $n_j$ are shown in Table 1.

TABLE 1

| Weight factors of friction terms | | | |
|---|---|---|---|
| $\mu$ | $m_1$ | $m_2$ | $n_1$ |
| 3 | 2.2457 | 6.8400 | 42.849 |

Figure 6:
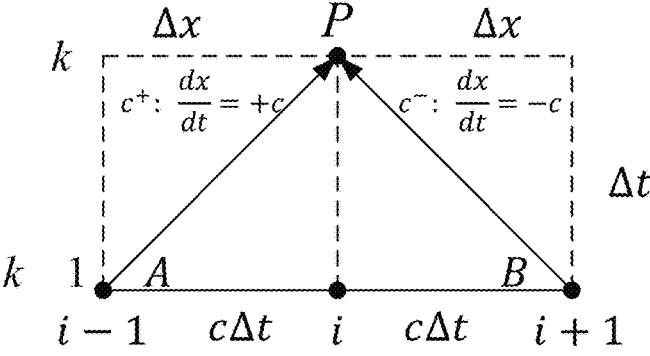
FIG. 6 is a schematic diagram of a computational grid model.

Based on the above contents, the calculation of the state of the point P at any position on the pipe is related to a time-space grid division. As shown in FIG. 6, a time-space grid model is established for the pipe, where k represents a time of the calculation, $k \geq 0$; and i represents a spatial point of pipe division, $1 \leq i \leq N$. $\Delta t$ represents a time interval, and $\Delta x$ is a pipe grid space interval.

Equations (14) and (15) for calculating the internal points of the pipe can be written as expressions related to time k-space i, that is, the state located at the pipe i at the time k can be expressed by the state of adjacent grid points ((i−1) and (i+1)) at the time (k−1) as follows:

$$q_i^k = \frac{1}{2}\left[q_{i-1}^{k-1} + q_{i+1}^{k-1} + \frac{A}{\rho c}\left(p_{i-1}^{k-1} - p_{i+1}^{k-1}\right) - \Delta t\left(f\left(q_{i-1}^{k-1}\right) + f\left(q_{i+1}^{k-1}\right)\right)\right], \tag{22}$$

$$p_i^k = \frac{1}{2}\left[p_{i-1}^{k-1} + p_{i+1}^{k-1} + \frac{\rho c}{A}\left(q_{i-1}^{k-1} - q_{i+1}^{k-1}\right) + \Delta t\frac{\rho c}{A}\left(f\left(q_{i+1}^{k-1}\right) - f\left(q_{i-1}^{k-1}\right)\right)\right]. \tag{23}$$

Similarly, when the point P is located at the left and right boundary points, that is, when i=1 and N, equations (16) and (17) can be written as:

$$q_1^k = q_2^{k-1} + \frac{A}{\rho c}\left(p_1^k - p_2^{k-1}\right) - \Delta t f\left(q_2^{k-1}\right), \tag{24}$$

$$q_N^k = q_{N-1}^k - \frac{A}{\rho c}\left(p_N^k - p_{N-1}^{k-1}\right) - \Delta t f\left(q_{N-1}^{k-1}\right), \tag{25}$$

where $$p_1^k$$

and $$p_N^k$$

are respectively the left boundary condition and the right boundary condition as follows:

$$p_1^k = p_{left}^k, \tag{26}$$

$$p_N^k = p_{right}^k. \tag{27}$$

Considering the friction term f(q) in the above equation, it can be seen from equations (18) and (19) that $$\sum_{j=1}^{4} y_j(t + \Delta t)$$

(t+Δt) in the friction term also changes with time k-space i, that is, the friction intermediate term $y_j(t+\Delta t)$ is also taken as $$y_{j_i}^k.$$

Therefore, at the time k, the states at the grid point i of the pipe include $$q_i^k,\ p_i^k,\ y_{1_i}^k,\ y_{2_i}^k,\ y_{3_i}^k\ \text{and}\ y_{4_i}^k.$$

Equations (22) and (23) can be written as:

$$q_i^k = \frac{1}{2}\left[q_{i-1}^{k-1} + q_{i+1}^{k-1} + \frac{A}{\rho c}\left(p_{i-1}^{k-1} - p_{i+1}^{k-1}\right) - \right. \tag{28}$$
$$\left. \Delta t\frac{8v}{r^2}\left(q_{i-1}^{k+1} + q_{i+1}^{k-1}\right) - \Delta t\frac{4v}{r^2}\left(\sum_{j=1}^{4} y_{j_{i-1}}^{k-1} + \sum_{j=1}^{4} y_{j_{i+1}}^{k-1}\right)\right],$$

$$p_i^k = \frac{1}{2}\left[p_{i-1}^{k-1} + p_{i+1}^{k-1} + \frac{\rho c}{A}\left(q_{i-1}^{k-1} - q_{i+1}^{k-1}\right) + \right. \tag{29}$$
$$\left. \Delta t\frac{\rho c}{A}\frac{8v}{r^2}\left(q_{i+1}^{k-1} - q_{i-1}^{k-1}\right) + \Delta t\frac{\rho c}{A}\frac{4v}{r^2}\left(\sum_{j=1}^{4} y_{j_{i+1}}^{k-1} - \sum_{j=1}^{4} y_{j_{i-1}}^{k-1}\right)\right],$$

wherein the friction intermediate term $$y_{j_i}^k, j = 1, 2, 3, 4,$$

is as follows:

$$y_{j_i}^k = y_{j_i}^{k-1} e^{-\frac{n_j v \Delta t}{r^2}} + m_j\left(q_i^k - q_i^{k-1}\right)e^{-\frac{n_j v \Delta t}{2r^2}}. \tag{30}$$

When i=1 and N, equations (32) to (35) of the boundary can be written as:

$$q_1^k = q_2^{k-1} + \frac{A}{\rho c}\left(p_1^k - p_2^{k-1}\right) - \Delta t\frac{8v}{r^2}q_2^{k-1} - \Delta t\frac{4v}{r^2}\left(\sum_{j=1}^{4} y_{j_2}^{k-1}\right), \tag{31}$$

$$q_N^k = q_{N-1}^k - \frac{A}{\rho c}\left(p_N^k - p_{N-1}^{k-1}\right) - \Delta t\frac{8v}{r^2}q_{N-1}^{k-1} = -\Delta t\frac{4v}{r^2}\left(\sum_{j=1}^{4} y_{j_{N-1}}^{k-1}\right), \tag{32}$$

$$p_1^k = p_{left}^k, \tag{33}$$

$$p_N^k = p_{right}^k. \tag{34}$$

Let $$\alpha = \frac{A}{\rho c},\ \beta = \Delta t\frac{4v}{r^2}\ \text{and}\ \gamma = -\frac{v\Delta t}{2r^2},$$

arrange equations (36) to (42) to obtain the following equations for calculating the grid state of the pipe.

Equations for calculating the internal points of the measured pipe are as follows:

$$q_i^k = \tag{35}$$
$$\frac{1-2\beta}{2}\left(q_{i-1}^{k-1} + q_{i+1}^{k-1}\right) + \frac{\alpha}{2}\left(p_{i-1}^{k-1} - p_{i+1}^{k-1}\right) - \frac{\beta}{2}\left(\sum_{j=1}^{4} y_{j_{i-1}}^{k-1} + \sum_{j=1}^{4} y_{j_{i+1}}^{k-1}\right),$$

$$p_i^k = \frac{1-2\beta}{2\alpha}\left(q_{i-1}^{k-1} - q_{i+1}^{k-1}\right) + \tag{36}$$
$$\frac{1}{2}\left(p_{i-1}^{k-1} + p_{i+1}^{k-1}\right) + \frac{\beta}{2\alpha}\left(\sum_{j=1}^{4} y_{j_{i+1}}^{k-1} - \sum_{j=1}^{4} y_{j_{i-1}}^{k-1}\right).$$

Equation for calculating the friction intermediate term is as follows:

$$y_{j_i}^k = m_j e^{n_j\gamma} q_i^k - m_j e^{n_j\gamma} q_i^{k-1} + e^{2n_j\gamma} y_{j_i}^{k-1}, \; j = 1, 2, 3, 4, \tag{37}$$

Equations for calculating the boundary points of the measured pipe are as follows:

$$q_1^k = (1 - 2\beta) q_2^{k-1} - \alpha p_2^{k-1} - \beta \sum_{j=1}^{4} y_{j_2}^{k-1} + \alpha p_1^k, \tag{38}$$

$$q_N^k = (1 - 2\beta) q_{N-1}^k + \alpha p_{N-1}^{k-1} - \beta \sum_{j=1}^{4} y_{j_{N-1}}^{k-1} + \alpha p_N^k, \tag{39}$$

$$p_1^k = p_{left}^k, \tag{40}$$

$$p_N^k = p_{right}^k. \tag{41}$$

Figure 7:
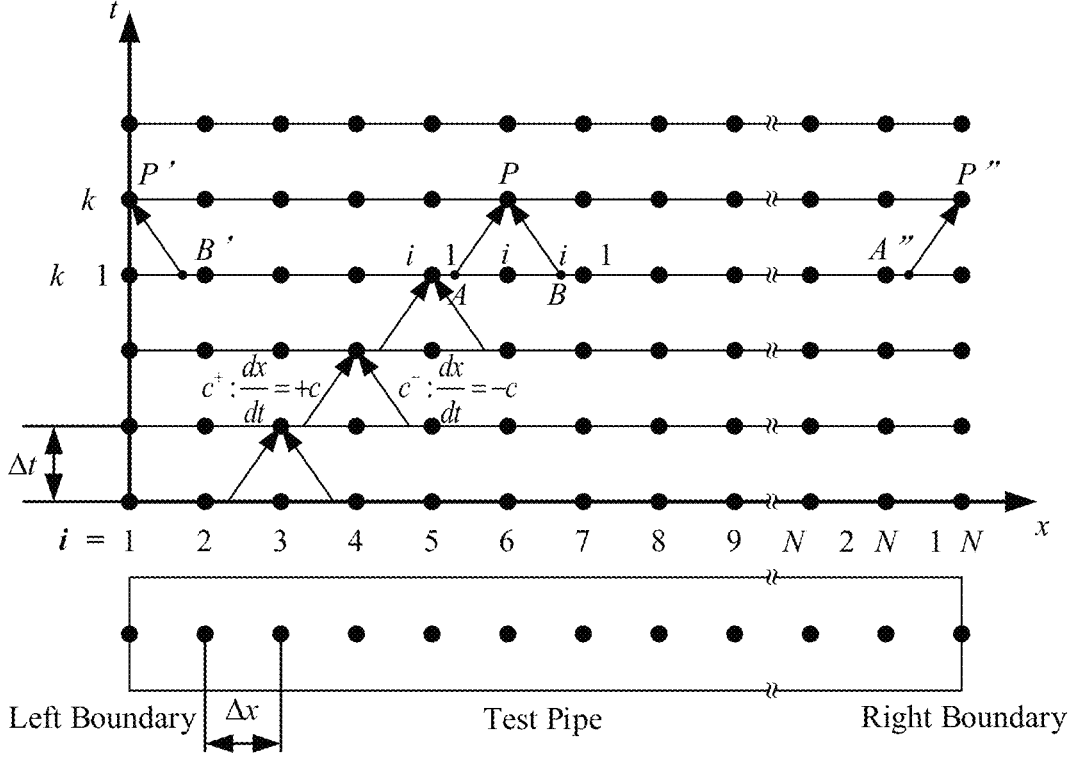
FIG. 7 is a schematic diagram of flow calculation considering grid interpolation.

In practical engineering applications, the time interval $\Delta t$ of the grid division is generally determined by a hardware system, the space interval $\Delta x$ is generally set artificially by an algorithm, and the wave velocity $c$ of the fluid is determined by the fluid itself. There are various error sources in the calculation process, it is almost impossible for the characteristic line to pass through the grid points exactly, and thus grid interpolation calculation needs to be performed, as shown in FIG. 7. In general, the space interval $\Delta x$ of the grid is set in the algorithm, so that the characteristic line falls between two grid points. At this time, the point A at the time $(k-1)$ can be calculated by interpolation based on the adjacent grid points $((i-1)$ and $i)$, and the point B at the time $(k-1)$ can be calculated by interpolation based on the adjacent grid points $(i$ and $(i+1))$, thereby compensating the arithmetic error caused by the characteristic line not passing through the grid, and the boundary points are the same.

Due to the relatively small grid division and considering the simplicity of research, linear interpolation method is adopted. At the time $k$, the states at the grid point $i$ of the pipe include the flow rate $$q_i^k,$$

the pressure $$p_i^k,$$

the friction intermediate terms $$y_{1_i}^k, y_{2_i}^k, y_{3_i}^k \text{ and } y_{4_i}^k.$$

Here, for the convenience of description, it is uniformly represented by $$x_i^k.$$

Therefore, the linear interpolation of the points A and B on the characteristic lines that fall between the grid points is calculated as follows:

$$x_{A_i}^{k-1} = \eta x_{i-1}^{k-1} + (1 - \eta) x_i^{k-1}, \tag{42}$$

$$x_{B_i}^{k-1} = (1 - \eta) x_i^{k-1} + \eta x_{i+1}^{k-1}, \tag{43}$$

where $$\eta = \frac{c\Delta t}{\Delta x}$$

represents an interpolation coefficient. When $\eta \in 0, 1$, the characteristic line must fall between the adjacent grid points, as shown in FIG. 7.

$$q_{i-1}^{k-1}, q_{i+1}^{k-1}, p_{i-1}^{k-1}, p_{i+1}^{k-1}, y_{j_{i-1}}^{k-1}, y_{j_{i+1}}^{k-1},$$

$$q_2^{k-1}, p_2^{k-1}, y_{j_2}^{k-1}, q_{N-1}^k, p_{N-1}^k \text{ and } y_{j_{N-1}}^{k-1}$$

in equations (43), (44), (46) and (47) all need to be calculated by interpolation, and are replaced with $$x_{A_i}^{k-1} \text{ and } x_{B_i}^{k-1}$$

in equations (42) and (43). Arrange and rewrite equations (43) to (49) to obtain the following equations.

Equations for calculating the internal points of the measured pipe are as follows:

$$q_i^k = \left[ \frac{\eta(1 - 2\beta)}{2} q_{i-1}^{k-1} + (1 - 2\beta)(1 - \eta) q_i^{k-1} + \frac{\eta(1 - 2\beta)}{2} q_{i+1}^{k-1} \right] \tag{44}$$
$$\frac{\alpha\eta}{2} \left[ p_{i-1}^{k-1} - p_{i+1}^{k-1} \right] - \left[ \sum_{j=1}^{4} \left( \frac{\beta\eta}{2} y_{1_{i-1}}^{k-1} + \beta(1 - \eta) y_{1_i}^{k-1} + \frac{\beta\eta}{2} y_{1_{i+1}}^{k-1} \right) \right],$$

$$p_i^k = \left[ \frac{\eta(1 - 2\beta)}{2\alpha} \left( q_{i-1}^{k-1} - q_{i+1}^{k-1} \right) \right] + \tag{45}$$
$$\left[ \frac{\eta}{2} p_{i-1}^{k-1} + (1 - \eta) p_i^{k-1} + \frac{\eta}{2} p_{i+1}^{k-1} \right] - \left[ \frac{\beta\eta}{2\alpha} \sum_{j=1}^{4} \left( y_{j_{i-1}}^{k-1} - y_{j_{i-1}}^{k-1} \right) \right].$$

Equation for calculating the friction intermediate term is as follows:

$$y_{j_i}^k = m_j e^{n_j\gamma} q_i^k - m_j e^{n_j\gamma} q_i^{k-1} + e^{2n_j\gamma} y_{j_i}^{k-1}, \; j = 1, 2, 3, 4. \tag{46}$$

Equations for calculating the boundary points of the measured pipe are as follows:

$$q_1^k = (1 - 2\beta) \left[ (1 - \eta) q_1^{k-1} + \eta q_2^{k-1} \right] - \tag{47}$$
$$\alpha \left[ (1 - \eta) p_1^{k-1} + \eta p_2^{k-1} \right] - \beta \left[ \sum_{j=1}^{4} \left( (1 - \eta) y_{j_1}^{k-1} + \eta y_{j_2}^{k-1} \right) \right] + \alpha p_1^k,$$

$$q_N^k = (1 - 2\beta) \left[ \eta q_{N-1}^k + (1 - \eta) q_N^k \right] + \tag{48}$$
$$\alpha \left[ \eta p_{N-1}^{k-1} + (1 - \eta) q_N^k \right] - \beta \left[ \sum_{j=1}^{4} \left( \eta y_{j_{N-1}}^{k-1} + (1 - \eta) y_{j_N}^{k-1} \right) \right] - \alpha p_N^k,$$

$$p_1^k = p_{left}^k, \tag{49}$$

$$p_N^k = p_{right}^k, \tag{50}$$

13

Further, it can be seen from the above contents that by taking the boundary pressure value of i=1 or N as the boundary condition, the states of boundary points and internal points are continuously calculated, where the states include the flow rate $$q_i^k,$$

the pressure $$p_i^k,$$

the friction intermediate terms $$y_{1_i}^k, y_{2_i}^k, y_{3_i}^k \text{ and } y_{4_i}^k.$$

In order to use the optimal estimation method of Kalman filter, it is necessary to establish a state space model of a stochastic system, including state equation and measurement equation.

First, a (6N×1)-dimensional state vector $X^k$ is constructed as follows:

$$X^k = [q^k, p^k, y_1^k, y_2^k, y_3^k, y_4^k]^T. \quad (51)$$

Equation (51) includes the following N-dimensional flow rate vector $q^k$, N-dimensional pressure vector $p^k$ and (4N×1)-dimensional friction intermediate term vector:

$$q^k = [q_1^k, q_2^k, \ldots q_i^k, \ldots q_{N-1}^k, q_N^k]^T,$$
$$p^k = [p_1^k, p_2^k, \ldots p_i^k, \ldots p_{N-1}^k, p_N^k]^T,$$
$$y_j^k = [y_1^k, y_2^k, y_3^k, y_4^k] = [y_{j_1}^k, y_{j_2}^k, \ldots y_{j_i}^k, \ldots, y_{j_{N-1}}^k, y_{j_N}^k]^T, j = 1, 2, 3, 4,$$

where k represents the time, k≥0; i represents the number of the grid point, 1≤i≤N, that is, it means that the measured pipe is divided into N grid points; j represents the serial number of the friction intermediate term, j=1, 2, 3, 4.

As shown in FIG. 1, the value collected by the pressure sensor at the middle position of the measured pipe is taken as the measured value, and a (1×1)-dimensional measurement vector $Z^k$ is constructed as follows:

$$Z^k = [p_{mid}]^T. \quad (52)$$

14

According to the state vector $X^k$ and the measurement vector $Z^k$, the state space model of the stochastic system is given as follows:

$$\begin{cases} X^k = \Phi^{\frac{k}{k-1}} X^{k-1} + B^k u^k + \Gamma^{\frac{k}{k-1}} W^{k-1}, \\ Z^k = H^k X^k + V^k \end{cases} \quad (53)$$

where $$\Phi^{\frac{k}{k-1}}$$

is a known structural parameter of the system, and is called (6N×6N)-dimensional state one-step transition matrix; $u^k$ is a known deterministic input sequence, and in this model, $u^k$ is a (2×1)-dimensional boundary pressure value; $B^k$ is an input coefficient matrix;

$$\Gamma^{\frac{k}{k-1}}$$

is a (6N×2)-dimensional noise distribution matrix of the system; $W^{k-1}$ is a (2×1)-dimensional noise vector of the system; $H^k$ is a (1×6N)-dimensional measurement matrix, and $V^k$ is a (1×1)-dimensional measurement noise vector.

For the convenience of calculation, first consider the first term of the state equation of equation (53), and let $$q^k = MX^{k-1},$$

$$p^k = NX^{k-1},$$

$$y_j^k = Aq^k + DX^{k-1} = AMX^{k-1} + DX^{k-1} = (AM + D)X^{k-1},$$

where M, N, A and D are (N×6N)-dimensional matrix, (N×6N)-dimensional matrix, (4N×N)-dimensional matrix and (4N×6N)-dimensional matrix, respectively. The first term of the state equation of equation (53) can be written as:

$$X^k = \begin{bmatrix} q^k \\ p^k \\ y_j^k \end{bmatrix} = \Phi^{\frac{k}{k-1}} X^{k-1} = \begin{bmatrix} M \\ N \\ AM + D \end{bmatrix} X^{k-1}. \quad (54)$$

According to the calculation equations (44) to (50) of the fluid of the pipe, the above matrix can be written as:

$$
M = \begin{bmatrix}
(1-2\beta)(1-\eta) & \eta(1-2\beta) & 0 & \cdots & 0 & 0 \\
\dfrac{\eta(1-2\beta)}{2} & (1-2\beta)(1-\eta) & \dfrac{\eta(1-2\beta)}{2} & \cdots & 0 & 0 \\
\vdots & \vdots & \vdots & \ddots & \vdots & \vdots \\
0 & 0 & 0 & \cdots & (1-2\beta)(1-\eta) & \dfrac{\eta(1-2\beta)}{2} \\
0 & 0 & 0 & \cdots & \eta(1-2\beta) & (1-2\beta)(1-\eta)
\end{bmatrix}
$$
(55)

$$
\left.\begin{array}{cccccc|cccccc}
-\alpha(1-\eta) & -\alpha\eta & 0 & \cdots & 0 & 0 & -\beta(1-\eta) & -\beta\eta & 0 & \cdots & 0 & 0 \\
\dfrac{\alpha\eta}{2} & 0 & -\dfrac{\alpha\eta}{2} & \cdots & 0 & 0 & \dfrac{-\beta\eta}{2} & -\beta(1-\eta) & \dfrac{-\beta\eta}{2} & \cdots & 0 & 0 \\
\vdots & \vdots & \vdots & \ddots & \vdots & \vdots & \vdots & \vdots & \vdots & \ddots & \vdots & \vdots \\
0 & 0 & 0 & \cdots & 0 & -\dfrac{\alpha\eta}{2} & 0 & 0 & 0 & \cdots & -\beta(1-\eta) & \dfrac{-\beta\eta}{2} \\
0 & 0 & 0 & \cdots & \alpha\eta & \alpha(1-\eta) & 0 & 0 & 0 & \cdots & -\beta\eta & -\beta(1-\eta)
\end{array}\right|_{\times 4},
$$

$$
M = \left.\begin{bmatrix}
0 & 0 & 0 & \cdots & 0 & 0 & 0 & 0 & 0 & \cdots & 0 & 0 & 0 & 0 & 0 & \cdots & 0 & 0 \\
\dfrac{\eta(1-2\beta)}{2\alpha} & 0 & \dfrac{\eta(2\beta-1)}{2\alpha} & \cdots & 0 & 0 & \dfrac{\eta}{2} & (1-\eta) & \dfrac{\eta}{2} & \cdots & 0 & 0 & \dfrac{-\beta\eta}{2\alpha} & 0 & \dfrac{\beta\eta}{2\alpha} & \cdots & 0 & 0 \\
\vdots & \vdots & \vdots & \ddots & \vdots & \vdots & \vdots & \vdots & \vdots & \ddots & \vdots & \vdots & \vdots & \vdots & \vdots & \ddots & \vdots & \vdots \\
0 & 0 & 0 & \cdots & 0 & \dfrac{\eta(2\beta-1)}{2\alpha} & 0 & 0 & 0 & \cdots & (1-\eta) & \dfrac{\eta}{2} & 0 & 0 & 0 & \cdots & 0 & \dfrac{\beta\eta}{2\alpha} \\
0 & 0 & 0 & \cdots & 0 & 0 & 0 & 0 & 0 & \cdots & 0 & 0 & 0 & 0 & 0 & \cdots & 0 & 0
\end{bmatrix}\right|_{\times 4},
$$
(56)

$$
A = \begin{bmatrix}
m_1 e^{n_1\gamma} & \cdots & 0 \\
\vdots & \ddots & \vdots \\
0 & \cdots & m_1 e^{n_1\gamma} \\
m_2 e^{n_2\gamma} & \cdots & 0 \\
\vdots & \ddots & \vdots \\
0 & \cdots & m_2 e^{n_2\gamma} \\
m_3 e^{n_3\gamma} & \cdots & 0 \\
\vdots & \ddots & \vdots \\
0 & \cdots & m_3 e^{n_3\gamma} \\
m_4 e^{n_4\gamma} & \cdots & 0 \\
\vdots & \ddots & \vdots \\
0 & \cdots & m_4 e^{n_4\gamma}
\end{bmatrix},
$$
(57)

$$
D = \begin{bmatrix}
-m_1 e^{n_1\gamma} & \cdots & 0 & & e^{2n_1\gamma} & \cdots & 0 & & & \\
\vdots & \ddots & \vdots & 0_{N\times N} & \vdots & \ddots & \vdots & 0_{N\times N} & 0_{N\times N} & 0_{N\times N} \\
0 & \cdots & -m_1 e^{n_1\gamma} & & 0 & \cdots & e^{2n_1\gamma} & & & \\
-m_2 e^{n_2\gamma} & \cdots & 0 & & & & & e^{2n_2\gamma} & \cdots & 0 \\
\vdots & \ddots & \vdots & 0_{N\times N} & 0_{N\times N} & & \vdots & \ddots & \vdots & 0_{N\times N} & 0_{N\times N} \\
0 & \cdots & -m_2 e^{n_2\gamma} & & & & & 0 & \cdots & e^{2n_2\gamma} & & \\
\vdots & & 0_{N\times N} & 0_{N\times N} & & 0_{N\times N} & & \ddots & & 0_{N\times N} \\
-m_4 e^{n_4\gamma} & \cdots & 0 & & & & & & & e^{2n_4\gamma} & \cdots & 0 \\
\vdots & \ddots & \vdots & 0_{N\times N} & 0_{N\times N} & & 0_{N\times N} & 0_{N\times N} & & \vdots & \ddots & \vdots \\
0 & \cdots & -m_4 e^{n_4\gamma} & & & & & & & 0 & \cdots & e^{2n_4\gamma}
\end{bmatrix},
$$
(58)

where $\alpha$, $\beta$, $\gamma$ have been given in the above contents; $\eta$ is an interpolation coefficient; $m_j$, $n_j$, j=1, 2, 3, 4 are weight factors, and the equations are (20) and (21).

Other matrices of the state space model (53) of the stochastic system are as follows:

$$u^k = \begin{bmatrix} p_{left} \\ p_{right} \end{bmatrix}, B^k = \begin{bmatrix} \alpha & 0 \\ \vdots & \vdots \\ 0 & -\alpha \\ 1 & 0 \\ \vdots & \vdots \\ 0 & 1 \\ 0_{4N\times 1} & 0_{4N\times 1} \end{bmatrix}, \tag{59}$$

$$W^{k-1} = \begin{bmatrix} w_{left}^{k-1} \\ w_{right}^{k-1} \end{bmatrix}, \Gamma^{\frac{k}{k-1}} = \begin{bmatrix} 1 & 0 \\ \vdots & \vdots \\ 0 & 1 \\ 1 & 0 \\ \vdots & \vdots \\ 0 & 1 \\ 0_{4N\times 1} & 0_{4N\times 1} \end{bmatrix}, \tag{60}$$

$$H^k = \begin{bmatrix} 0_{1\times N} & \overbrace{0 \ \dots \ 1 \ \dots \ 0}^{N} & 0_{4\times 1} \end{bmatrix} V^k = \begin{bmatrix} w_{mid}^{k-1} \end{bmatrix}, \tag{61}$$

where $$w_{left}^{k-1} \searrow \quad w_{right}^{k-1} \searrow \quad w_{mid}^{k-1}$$

are measured white noises measured by the pressure sensors disposed at the left boundary, the right boundary and the middle position of the pipe at the time (k−1), that is, satisfy the following equation:

$$\begin{cases} E[W_k] = 0, & E[W_k W_j^T] = Q_k \\ E[V_k] = 0, & E[V_k V_j^T] = R_k \\ E[W_k V_j^T] = 0 \end{cases} \tag{62}$$

It can be seen from the above contents, it can be seen that the state space model of the stochastic system is constructed by equations (51) to (62), mainly the state equation and measurement equation of equation (53). The state equation contains the calculation equation of the grid fluid state of the pipe, and describes that the states (the flow rate, the pressure and the friction intermediate term) at respective positions of the measured pipe are calculated in real time based on the boundary input conditions (the pressures of left and right boundaries). The measurement equation (that is, information of the pressure sensor in the middle position of the measured pipe is obtained as measurement values to construct the equation) continuously optimizes the states in the state equation in real time.

Optionally, that the pipe hydrodynamics module is optimized based on the predicted pressure and monitoring pressure to enable the predicted pressure constantly close to the monitoring pressure comprises:

based on the predicted pressure and monitoring pressure, by optimizing the algorithm module, calculating the uncertainty of the algorithm model and the observation model under the experimental conditions, acquiring the weight value of the monitoring pressure and observation pressure based on the uncertainty, performing the weighted average between the predicted pressure and the monitoring pressure, the predicted pressure value with better accuracy can be acquired and the pipe hydrodynamics module can be corrected, so that the predicted pressure is constantly close to the accurate pipe pressure which is the monitoring pressure.

In other words, substituting the boundary pressure values acquired by the first and second pressure sensors into the pipe hydrodynamics model to acquire the predicted pressure at the position of the third pressure sensor on the test straight pipe; combining with the optimization algorithm model, correcting the parameters of the model continuously in the process of solving, so that the predicted pressure is continuously close to the monitoring pressure acquired by the third pressure sensor, and the optimization process will come to an end until the error is within the acceptable range.

Optionally, that based on the boundary pressures and the pipe hydrodynamics module, the flow rate of the fluid in the test straight pipe is acquired comprises:

based on the boundary pressures and the optimized pipe hydrodynamics module, the predicted pressure and the initial flow rate of the fluid in the straight pipe are calculated firstly; then, while continuously correcting the predicted pressure and optimizing the pipe hydrodynamics module, the flow rate of the fluid in the straight pipe calculated from the pipe hydrodynamics equation is constantly close to the real value.

It can be seen from the above description that the principle of the device and method for measuring flow rate based on dynamic optimization of three pressure sensors in the embodiments of the present disclosure is to optimally estimate the current flow rate value of the fluid in the test straight pipe 1 according to the pressure values of the boundary pressure sensors and the monitoring pressure sensor at the current time. Specifically, the principle is as follows.

1) The fluid pressure value measured by the boundary pressure sensors at the current time is acquired or collected;

2) the boundary pressures acquired or collected by the flow rate calculation estimator 3 are substituted into the pipe hydrodynamics module as an external condition, and the pressure at the position of the monitoring pressure sensor at the current time is calculated according to the pipe hydrodynamics module;

3) the real fluid pressure measured by the monitoring pressure sensor at the current time is acquired or collected;

4) in the flow rate calculation estimator 3, the real monitoring pressure is taken as a reference, and the real monitoring pressure is updated using the dynamic optimization algorithm model, until the pressure calculated in step 2) is close to that calculated in step 3); and 5) based on the boundary pressure measurement values at both ends, the flow rate of the test straight pipe 1 is accurately calculated by using the dynamic optimized pipe hydrodynamics module.

In the description of this specification, the descriptions of the terms "one embodiment/mode", "some embodiments/modes", "examples", "specific examples", or "some examples" means that the specific features, structures, materials, or characteristics described in connection with the embodiment/mode or example are included in at least one embodiment/mode or example of the present application. In this specification, the schematic expression of the above terms does not necessarily refer to the same embodiment/mode or example. Moreover, the specific features, structures, materials, or characteristics described can be combined in any suitable manner in any one or more embodiments/modes or examples. In addition, without contradicting each other, those skilled in the art may combine different embodiments/modes or examples and features of the different embodiments/modes or examples described in this specification.

In addition, the terms "first" and "second" are used for description purposes only, and cannot be understood as indicating or implying relative importance or implicitly indicating the number of technical features indicated. Thus, the features defined as "first" and "second" may include at least one of the features either explicitly or implicitly. In the description of the present application, the meaning of "plurality" is at least two, such as two, three, etc., unless specifically defined otherwise.

Those skilled in the art should understand that the above-mentioned embodiments are only for clearly illustrating the present disclosure, rather than limiting the scope of the present disclosure. For those skilled in the art, other changes or modifications can be made on the basis of the above disclosure, and these changes or modifications are still within the scope of the present disclosure.

The invention claimed is:

1. A device for measuring flow rate based on dynamic optimization of three pressure sensors, characterized in that, the device comprises: a test straight pipe, a flow rate calculation estimator and three pressure sensors;

the test straight pipe has an equal cross-section passage and is configured to provide a passage through which a measured fluid flows; a first pressure sensor and a second pressure sensor are respectively set on a boundary of both ends of the test straight pipe, and are configured to measure boundary pressures of two ends of the fluid in the test straight pipe; and a third pressure sensor is set on the test straight pipe between the first pressure sensor and the second pressure sensor to measure monitoring pressure of the fluid in the middle of the test straight pipe; and the flow rate calculation estimator is respectively connected to the three pressure sensors, and is configured to acquire a flow rate of the fluid in the test straight pipe according to the boundary pressures and the monitoring pressure;

a pipe hydrodynamics module, a dynamic optimization module and a flow rate calculation module are integrated in the flow rate calculation estimator;

the pipe hydrodynamics module is configured to acquire a predicted pressure of the fluid in the middle of the test straight pipe according to the boundary pressures;

the dynamic optimization module is configured to optimize the pipe hydrodynamics module according to the predicted pressure and the monitoring pressure to enable the predicted pressure is constantly close to the monitoring pressure, so that a difference between the predicted pressure and the monitoring pressure is reduced and finally falls into a reference range which is adjusted or set according to actual accuracy requirements; and the flow rate calculation module is configured to acquire the flow rate of the fluid in the test straight pipe according to the boundary pressures and the optimized pipe hydrodynamics module.

2. The device for measuring flow rate based on dynamic optimization of three pressure sensors according to the claim 1, characterized in that, the pressure of the fluid in the test straight pipe is measured by the pressure sensors in a non intrusive manner.

3. A method for measuring flow rate based on dynamic optimization of three pressure sensors, characterized in that, the method is applied to the device for measuring flow rate based on dynamic optimization of three pressure sensors according to the claim 1, and the method comprises:

acquiring boundary pressures of a fluid in both ends of a test straight pipe and a monitoring pressure of the fluid in the middle of the test straight pipe;

acquiring a predicted pressure of the fluid in the middle of the test straight pipe according to the boundary pressures;

optimizing a pipe hydrodynamics module according to the predicted pressure and the monitoring pressure to enable the predicted pressure constantly close to the monitoring pressure, so that a difference between the predicted pressure and the monitoring pressure is reduced and finally falls into a reference range which is adjusted or set according to actual accuracy requirements; and acquiring a flow rate of the fluid in the test straight pipe according to the boundary pressures and the optimized pipe hydrodynamics module.

4. The method for measuring flow rate based on dynamic optimization of three pressure sensors according to the claim 3, characterized in that, acquiring a predicted pressure of the fluid in the middle of the test straight pipe according to the boundary pressures comprises:

inputting the boundary pressures into the pipe hydrodynamics module, and acquiring the predicted pressure by solving a pipe hydrodynamics equation according to a method of characteristics.

* * * * *